Aug. 4, 1936.   J. S. MILLS   2,049,714
RADIATOR SUPPORT
Original Filed April 23, 1934   2 Sheets-Sheet 1
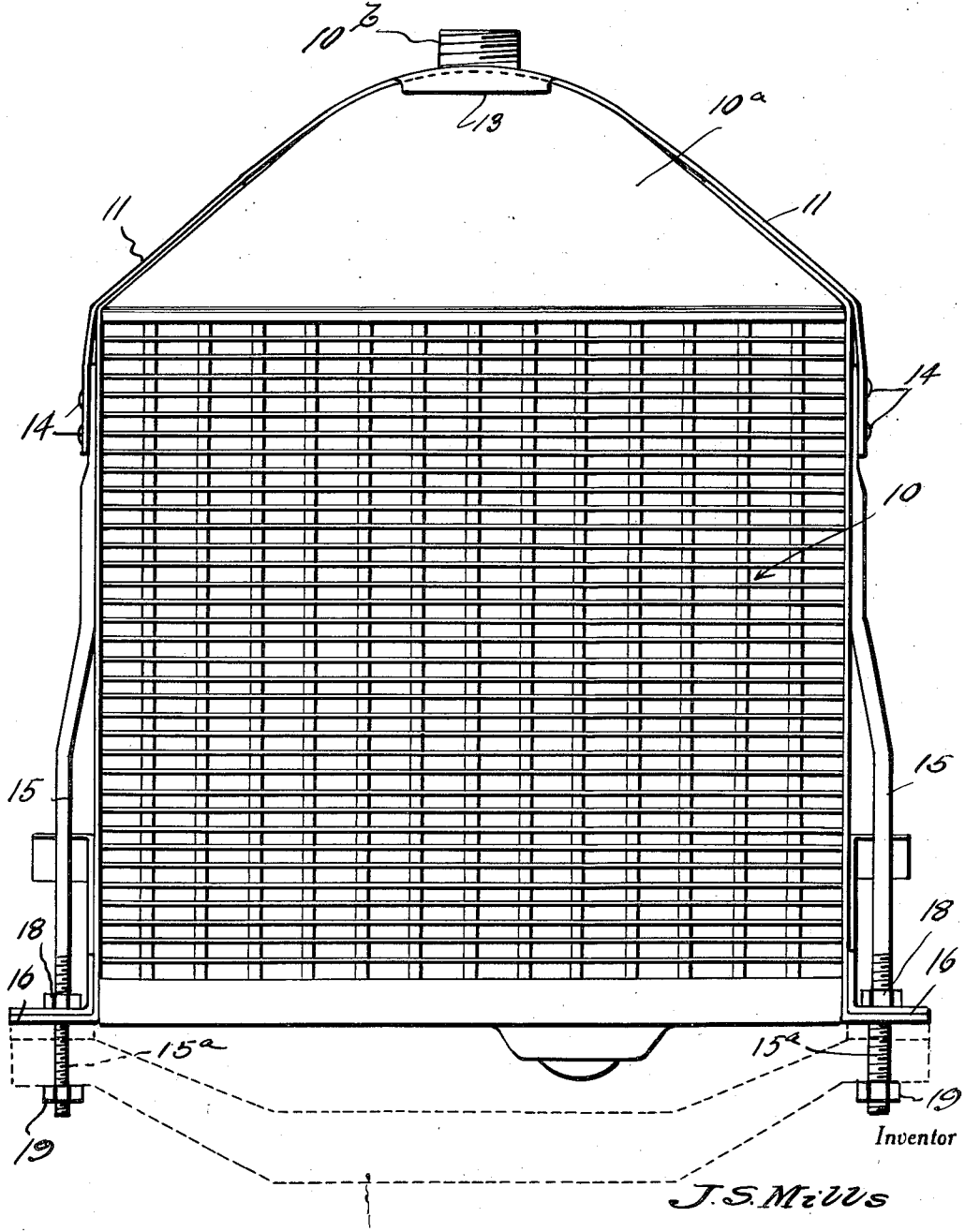
Inventor
J. S. Mills
By Clarence A. O'Brien
Attorney

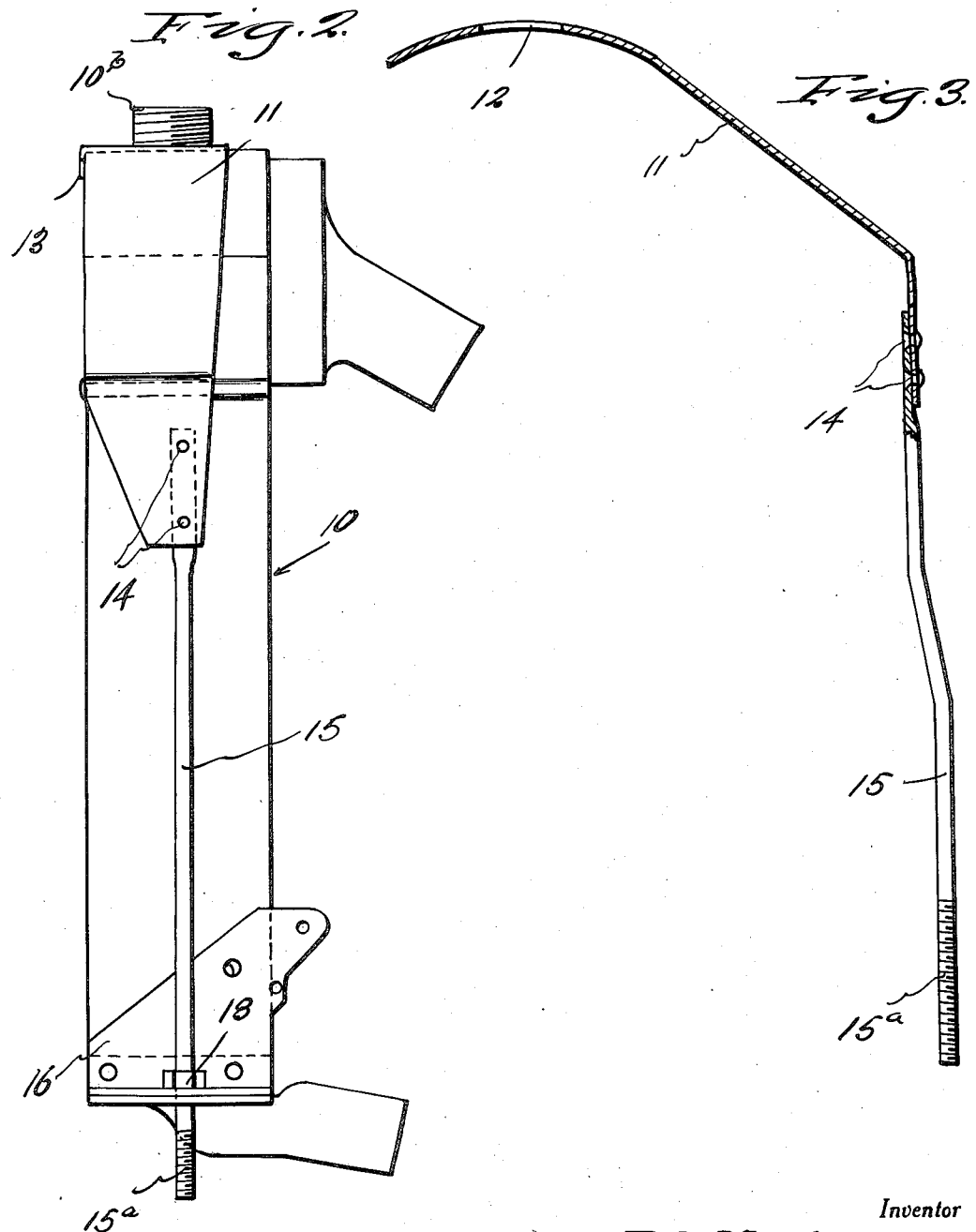

Patented Aug. 4, 1936

2,049,714

UNITED STATES PATENT OFFICE 2,049,714

RADIATOR SUPPORT

James Sanders Mills, Artesia, N. Mex.

Application April 23, 1934, Serial No. 722,021
Renewed January 7, 1936

2 Claims. (Cl. 180—68)

This invention is a support for a radiator and the object of the invention is to provide such a support which may be readily applied to the radiator of an automobile and which when applied will so support and brace the radiator as to reduce to a minimum breakage and leakage of the radiator.

It is also an object of this invention to provide a support of the character above mentioned which may be readily applied to any type of automobile radiator, and which is of extreme simplicity in construction, can be applied without requiring a high degree of skill, and will not materially detract from the appearance of the automobile.

The invention together with its objects and advantages will be best understood from a study of the following description taken in connection with the accompanying drawings wherein:

Figure 1 is an elevational view of a radiator having the support associated therewith.

Figure 2 is a side elevational view thereof and

Figure 3 is an enlarged fragmentary view of the support, certain parts being broken away and shown in section.

Referring to the drawings by reference numerals it will be seen that I have illustrated the support as applied to radiators commonly used with certain models of Ford automobiles, and that the radiator herein illustrated is indicated by the reference numeral 10.

The improved support comprises what may be termed a head strap 11 formed of metal or other suitable and somewhat yieldable material and adapted to be disposed across the top of the head 10a of the radiator in a manner clear from a study of Figures 1 and 2. At the center, or intermediate its ends, the strap 11 is provided with an opening 12 to accommodate the filling neck 10b of the radiator, and at its forward edge this strap is provided with a short flange 13 that overlaps the front face of the head 10a and will serve to prevent rotative movement of the strap 11 about the neck 10b as an axis.

The strap 11 is of such a length as, at its ends, to extend downwardly along the sides of the radiator as shown in Figure 1, and at said ends the strap 11 is tapered or reduced in width and is riveted or otherwise secured as at 14 to tie rods 15. The tie rods 15 have offset intermediate portions so that end portions of the tie rods connected with the strap 11 are in flat intimate contact with the sides of the radiator 10 while the free end portions of the rods 15 are laterally spaced from the radiator 10 and terminate in threaded ends 15a that extend through the securing clamps 16 usually provided for securing the lower portion of the radiator 10 to the frame part 17 of the automobile. The ends 15a of the tie rods also extend through suitable openings provided in the part 17 of the automobile and are provided with upper and lower nuts 18 and 19 respectively, which nuts serve to secure the support in position.

It will be apparent that with a support of this character applied to the radiator in this manner above described and illustrated in the drawings reinforcement is provided for the head 10a of the radiator and at the upper portion of the sides of the body of the radiator, at which points such reinforcement is desirable because it is generally at these points that breakage and leakage first occurs. This is due to the fact that from experience it has been found that the side members or walls of the radiator are generally the first to break, and this results in leakage at the ends of the uppermost tubes. As a result of this the bolts usually provided for securing the clamps 16 at the bottom of the radiator to the frame of the vehicle in time work loose and this latter feature is overcome by the positive connection of the ends of the tie rods 15 with the clamps 16 and the frame 17 of the automobile.

Having thus described my invention, what I claim as new is:

1. In a motor vehicle, the combination with a radiator, a chassis frame part and brackets securing the lower portion of the radiator to the chassis frame part; a support for the radiator comprising a relatively broad strap extending across the head of the radiator to terminate at opposite sides of the radiator below the plane of said head, said strap intermediate its ends being provided with an opening through which the filling neck of the radiator extends, and being also provided at one edge with a depending flange engaging the front side of the radiator head to prevent rotative movement of the strap about the filling neck as an axis, tie-bolts secured at their upper ends to the ends of said strap and extending downwardly at opposite sides of the radiator, said tie-bolts having threaded ends extending through aligned apertures in the said attaching brackets and frame part, and upper and lower nuts on the threaded ends of said tie-bolts and engaging respectively said brackets and the underside of said frame part to secure the support in position with said strap in flat intimate contact with the top and sides of the radiator head.

2. In a motor vehicle, the combination with a radiator, a chassis frame part and brackets securing the lower portion of the radiator to the chassis frame part; a support for the radiator comprising a relatively broad strap extending across the head of the radiator to terminate at opposite sides of the radiator below the plane of said head, said strap intermediate its ends being provided with an opening through which the filling neck of the radiator extends, and being also provided at one edge with a depending flange engaging the front side of the radiator head to prevent rotative movement of the strap about the filling neck as an axis, tie-bolts secured at their upper ends to the ends of said strap and extending downwardly at opposite sides of the radiator, said tie-bolts having threaded ends extending through aligned apertures in the said attaching brackets and frame part, and upper and lower nuts on the threaded ends of said tie-bolts and engaging respectively said brackets and the underside of said frame part to secure the support in position with said strap in flat intimate contact with the top of the radiator head, and said tie-bolts being offset intermediate their ends to provide upper portions in flat intimate contact with the sides of the radiator and lower portion in slightly spaced parallel relation to the sides of the radiator.

JAMES SANDERS MILLS.